US008777204B2

(12) United States Patent
Ruland

(10) Patent No.: US 8,777,204 B2
(45) Date of Patent: Jul. 15, 2014

(54) CUTTING SUPPORT

(75) Inventor: Rodd R Ruland, Amherst, NH (US)

(73) Assignee: Hubbell Incorporated, Shelton, CT (US)

( * ) Notice: Subject to any disclaimer, the term of this patent is extended or adjusted under 35 U.S.C. 154(b) by 954 days.

(21) Appl. No.: 12/657,402

(22) Filed: Jan. 19, 2010

(65) Prior Publication Data

US 2010/0181711 A1 Jul. 22, 2010

Related U.S. Application Data

(60) Provisional application No. 61/205,812, filed on Jan. 22, 2009.

(51) Int. Cl.
*B23Q 3/02* (2006.01)
*B25H 1/08* (2006.01)
*B27B 21/00* (2006.01)

(52) U.S. Cl.
CPC . *B27B 21/00* (2013.01); *B25H 1/08* (2013.01)
USPC .................................................. 269/95; 269/3

(58) Field of Classification Search
USPC .............................................. 269/3, 6, 95, 17
See application file for complete search history.

(56) References Cited

U.S. PATENT DOCUMENTS 2,883,184 A * 4/1959 Brewington ...................... 269/9
4,641,822 A * 2/1987 Fenerty ......................... 269/296
4,807,381 A 2/1989 Southard ........................... 42/94
5,050,330 A 9/1991 Pilgrim et al. .................... 42/94
5,092,571 A 3/1992 Stevens ......................... 269/296
5,526,897 A 6/1996 Schiller .......................... 182/129
5,613,655 A * 3/1997 Marion ........................ 248/68.1
5,727,778 A * 3/1998 Nodar ............................. 269/43
6,024,192 A 2/2000 Griffin .......................... 182/129
6,134,798 A 10/2000 Duncan et al. .................. 33/484
6,264,151 B1 7/2001 Schiller .......................... 248/238
6,554,265 B2 * 4/2003 Andronica .................... 269/268
7,316,390 B2 * 1/2008 Burlison ....................... 269/274
7,722,019 B2 * 5/2010 Losi et al. ......................... 269/9
2004/0065989 A1 4/2004 Campbell ...................... 269/17
2007/0193829 A1 8/2007 Astor et al. ................... 182/129

FOREIGN PATENT DOCUMENTS

DE 20304531 8/2004

* cited by examiner

*Primary Examiner* — Brian Glessner
*Assistant Examiner* — Adam Barlow
(74) *Attorney, Agent, or Firm* — Harrington & Smith

(57) ABSTRACT

A cutting support including a first section and a second section. The first section has a top side with at least two recesses extending into the first section from the top side. A first one of the recesses has a first shape. A second one of the recesses has a different second shape. The first shape comprises a generally semi-circular section. The second shape comprises at least one generally right-angle corner. The second section is connected to the first section for connecting the cutting support to another member.

6 Claims, 11 Drawing Sheets

CUTTING SUPPORT

CROSS REFERENCE TO RELATED APPLICATION

This application claims the benefit under 35 U.S.C. 119(e) of U.S. provisional patent application No. 61/205,812 filed Jan. 22, 2009 which is hereby incorporated by reference in its entirety.

BACKGROUND OF THE INVENTION

1. Field of the Invention

The invention relates to a support for stably supporting a member during cutting. The support is sized and shaped to stably supporting a member having a curved outer surface or a member having a flat side.

2. Brief Description of Prior Developments

FIG. 1 shows a pair of supports 10 which are mounted to a lip 12 of a pail 14. FIG. 2 shows a side view of one of the supports 10. The supports 10 allow a user 16 to place a pipe or conduit 18 in slots 20 of the supports 10 and establish a stable platform for supporting the pipe 18 for cutting the pipe 18 with a cutting tool 22, such as a hand saw for example. The MVP: MOTIONLESS VISE™ for pails is offered for sale by Electrical Wire Management, Inc. of Rockford, Ill. The slots 20 have the same general shape with a curved bottom end, but different sizes to accommodate different diameter pipes.

FIG. 3 shows a hand cart 26 with supports 28 on rear side stringers 30. The supports 28 have slots 32 configured to support a pipe 18 for cutting as illustrated by FIG. 4. The slots 32 have the same general shape with a curved bottom end, but different sizes to accommodate different diameter pipes.

SUMMARY

The following summary is merely intended to be exemplary. The summary is not intended to limit the scope of the claimed invention.

In accordance with one aspect of the invention, a cutting support is provided including a first section and a second section. The first section has a top side with at least two recesses extending into the first section from the top side. A first one of the recesses has a first shape. A second one of the recesses has a different second shape. The first shape comprises a generally semi-circular section. The second shape comprises at least one generally right-angle corner. The second section is connected to the first section for connecting the cutting support to another member.

In accordance with another aspect of the invention, a device is provided comprising a first cutting support, a second cutting support, and a connection movably connecting the first and second cutting supports to each other between a collapsed configuration and an extended configuration. The first cutting support comprises a top side with at least two recesses extending into the top side. The recesses have different shapes with a first one of the recesses comprising a general semi-circular section and a second one of the recesses comprising a general right-angle corner. The second cutting support comprises a plurality of recesses. The first and second cutting supports are sized and shaped to be removably mounted to a lip of a pail. The recesses are sized and shaped to support an article between the first and second cutting supports in at least two of their respective recesses such that the article can be cut.

In accordance with another aspect of the invention, a method is provided comprising forming a first recess in a generally flat frame member, wherein the first recess extends into a top side of the frame member, and wherein the first recess comprises a generally semi-circular section; forming a second recess in the frame member, wherein the second recess extends into the top side and comprises a general right-angle corner; and forming a mounting section at a bottom side of the frame member, wherein the mounting section is sized and shaped to removably mount to a lip of a pail, and wherein a cutting support is formed.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 5:
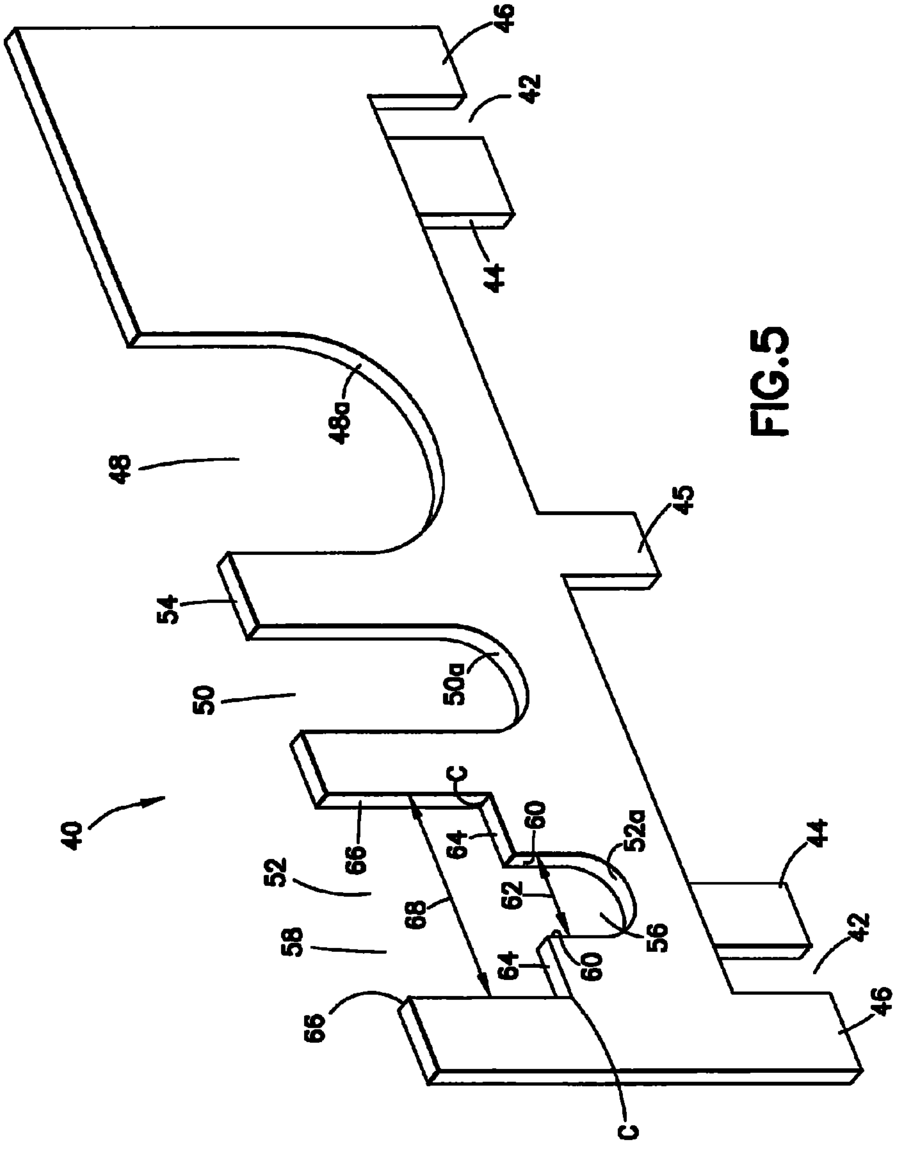
FIG. 5 is a perspective view of a support comprising features of the invention.

Referring to FIG. 5, there is shown a perspective view of a support 40 incorporating features of the invention. Although the invention will be described with reference to the example embodiments shown in the drawings, it should be understood that the invention can be embodied in many alternate forms of embodiments. In addition, any suitable size, shape or type of elements or materials could be used.

Figure 1:
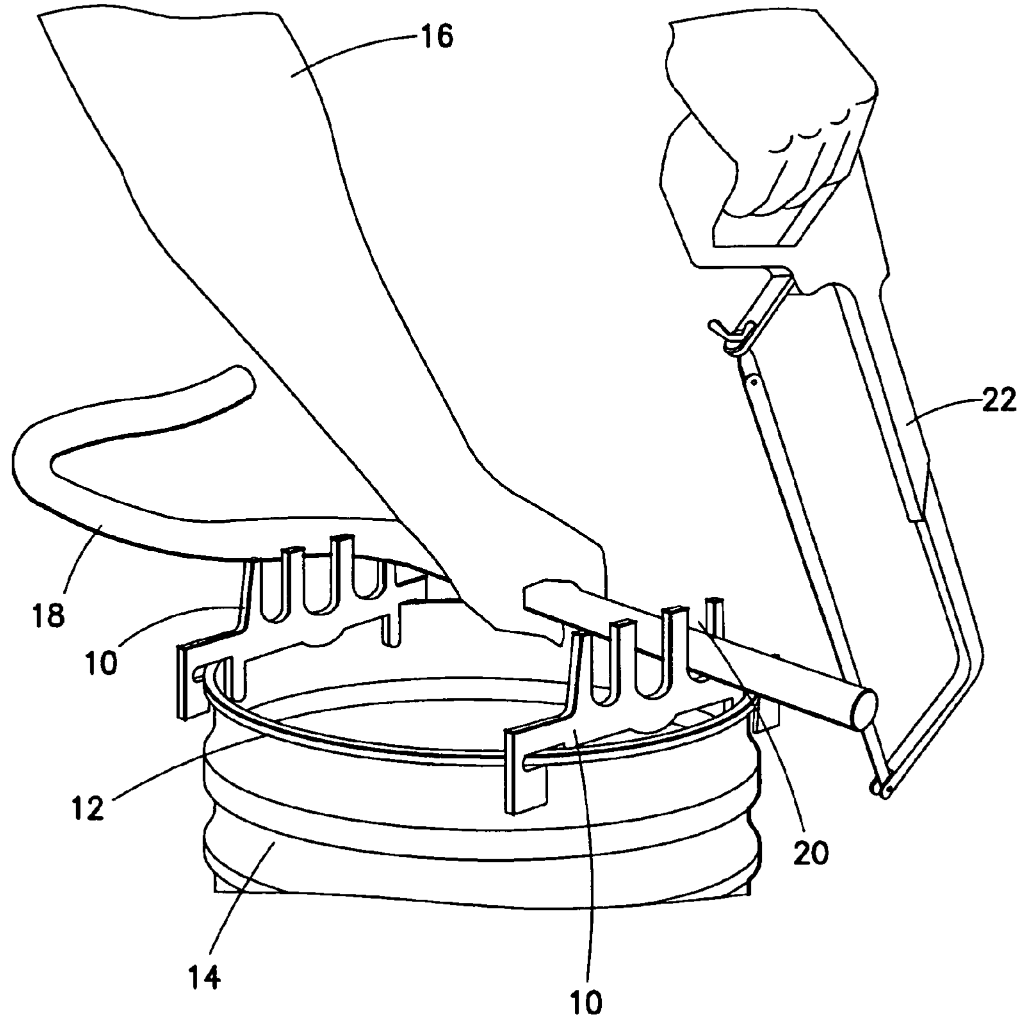
FIG.1 PRIOR ART
FIG. 1 is a perspective view of conventional pail mounted supports used to support an article during cutting.
Figure 2:
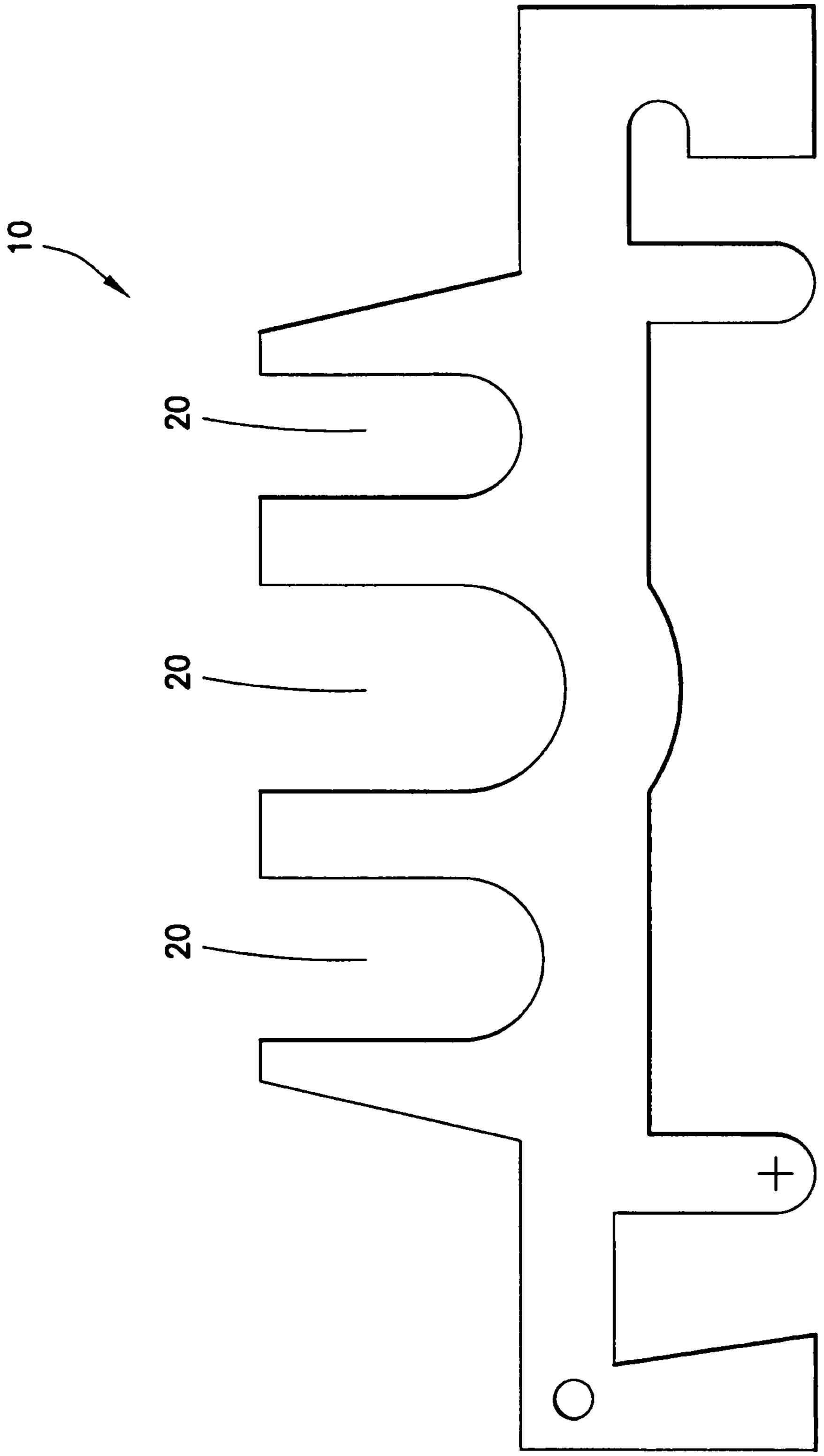
FIG.2 PRIOR ART
FIG. 2 is a side view of one of the supports shown in FIG. 1.

The support 40, in this embodiment, is a one-piece member, such as made of metal or plastic for example. The support 40 is configured to mount on a lip 12 of a pail 14 similar to the support 10 shown in FIGS. 1 and 2. The bottom side of the support 40 has lip receiving slots 42 which are sized and shaped to receive portions of the lip 12 therein. The slots 42 are formed between tabs 44 and end sections 46. The tabs 44 could be in line with the rest of the support 40 or laterally offset. A middle tab 45 is also provided.

The support 40 has slots 48, 50 and 52 extending downward from its top side 54. All three slots 48-52 have bottom ends with semi-circular surfaces 48*a*, 50*a*, 52*a*. However, each semi-circular surface 48*a*, 50*a*, 52*a* has a different size to matingly accommodate different size diameter pipes therein. In this embodiment, 48*a* is the largest, 52*a* is the smallest, and 50*a* is between the two sizes.

In this embodiment the third slot 52 has a bottom section 56 and a top section 58. The bottom section 56 has the semi-circular surface 52*a* and side walls 60 spaced at a distance 62. The top section 58 is substantially square or rectangular. The top section 58 has bottom surfaces 64 on opposite sides of the top entrance into bottom section 56, and side walls 66 spaced at a distance 68. Distance 68 is larger than distance 62. In the embodiment shown, the distance 68 is sufficiently large to accommodate a standard size wood lumber member, such as a 2×4 stud for example. Sides 66 are orthogonal to surfaces 64. Thus, a corner of a wood stud can be tightly fit in one of the corners C.

The support 40 can be used with a matching support 40 on a pail 14 to provide a safe and sturdy cutting support for pipe/conduit 18 or a wood member having a square or rectangular profile or cross-section such as a 2×4 stud for example (or other square or flat sided products). The wood member can be located in the top section 58 and have its bottom side supported on the surfaces 64. Thus, the wood member does not enter the bottom section 56. One of the walls 66 can act as a side support during cutting. Thus, unlike the prior art support 10 which can only be used to stably support members (such as pipe or conduit) having round outer surfaces, the support 40 can be used to stably support both members (such as pipe or conduit) having round outer surfaces and members having non-rounded outer surfaces, such as having a flat side.

Figure 6:
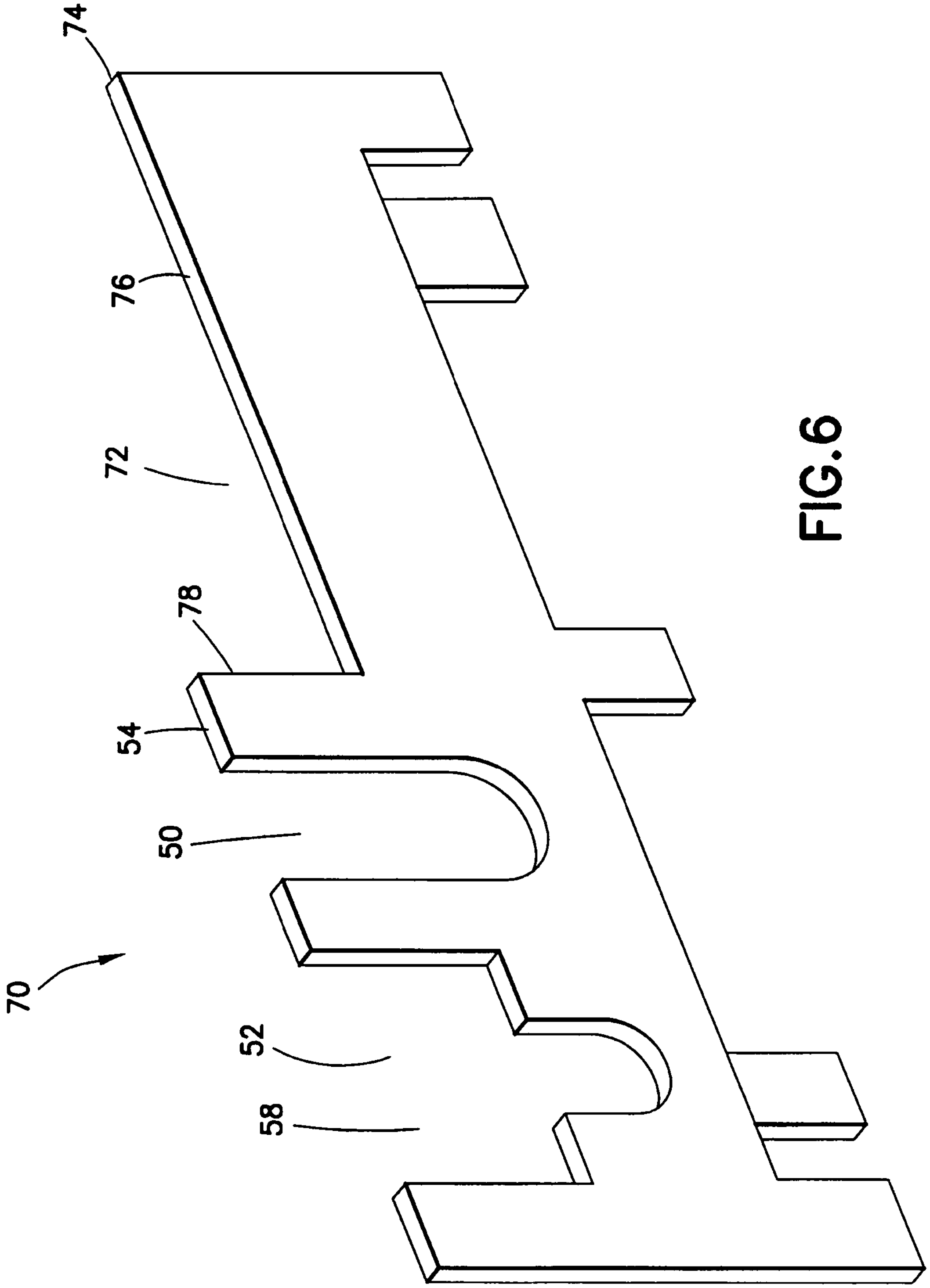
FIG. 6 is a perspective view of an alternate embodiment of the support shown in FIG. 5.

Referring also to FIG. 6, an alternate embodiment of the invention is shown. In this embodiment the support 70 has slots 50 and 52, but not the slot 48. Instead, the support 70 has a recess 72. The recess 72 in this embodiment extends down from the top side 54 and is open at the end 74. The recess 72 has a flat bottom side 76 and a flat side wall 78. The recess 72 provides a platform for cutting wood studs larger than the top section 58 would accommodate. For example, the recess 72 could accommodate a range such as 2×4, or 2×6, or 2×8, etc. The bottom side 76 provides a support surface for having the bottom side of the wood member located thereagainst. The side wall 78 forms a locating tab surface for locating a side edge of the wood member thereagainst.

Figure 7:
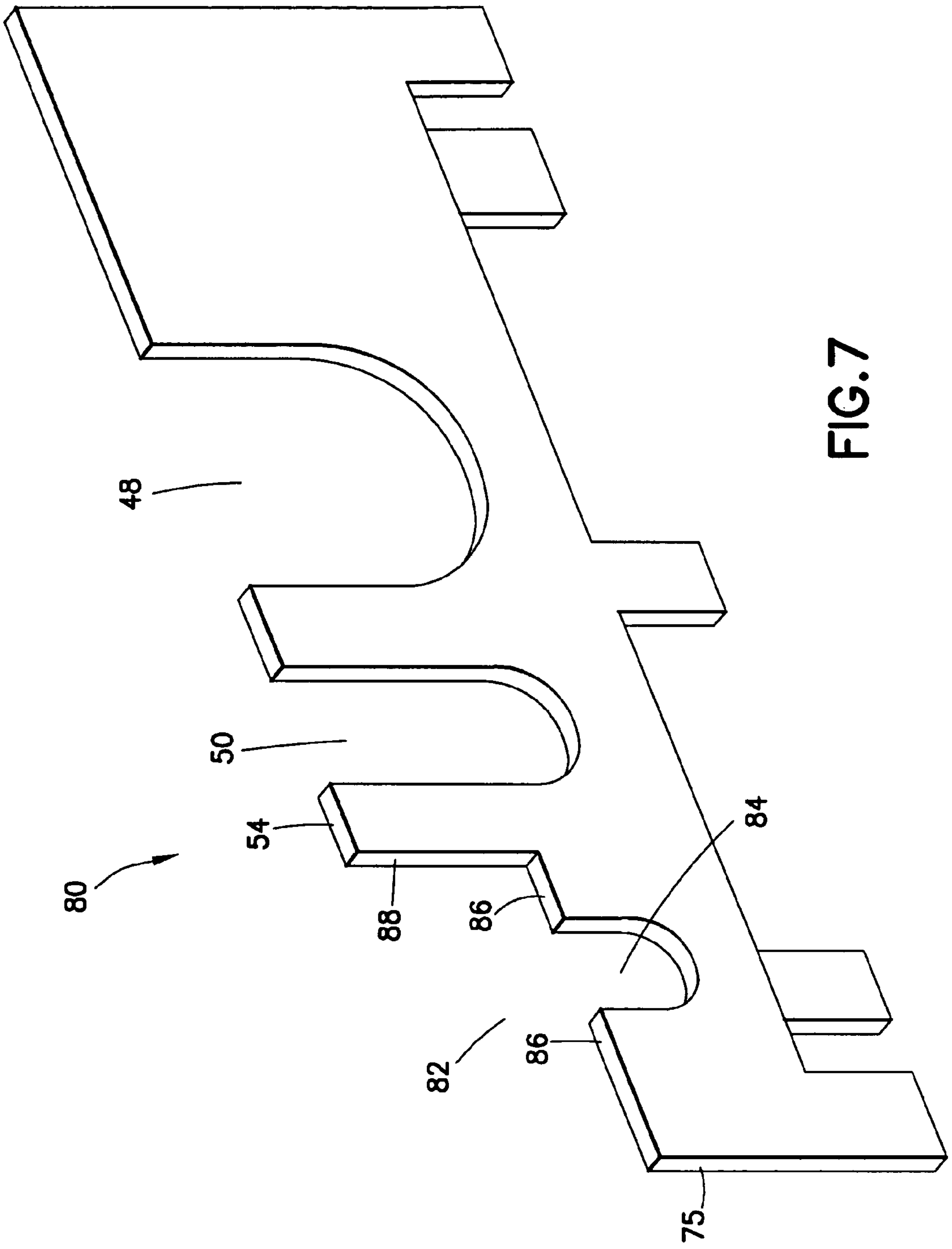
FIG. 7 is a perspective view of another alternate embodiment of the support shown in FIG. 5.

Referring also to FIG. 7, an alternate embodiment of the invention is shown. In this embodiment the support 80 has slots 48 and 50, but not the slot 52. Instead, the support 80 has a recess 82 and a third slot 84. The recess 82 in this embodiment extends down from the top side 54 and is open at the end 75. The recess 82 has flat bottom sides 86 and a flat side wall 88. The recess 82 provides a platform at surfaces 86 for cutting wood studs larger than the top section 58 would accommodate. For example, the recess 82 could accommodate a range such as 2×4, or 2×6, or 2×8, etc. The bottom sides 86 provides a support surface for having the bottom side of the wood member located thereagainst. The side wall 88 forms a locating tab surface for locating a side edge of the wood member thereagainst. The third slot 84 is the same size and shape as the bottom section 56. The third slot 84 extends down from the recess 82.

Figure 3:
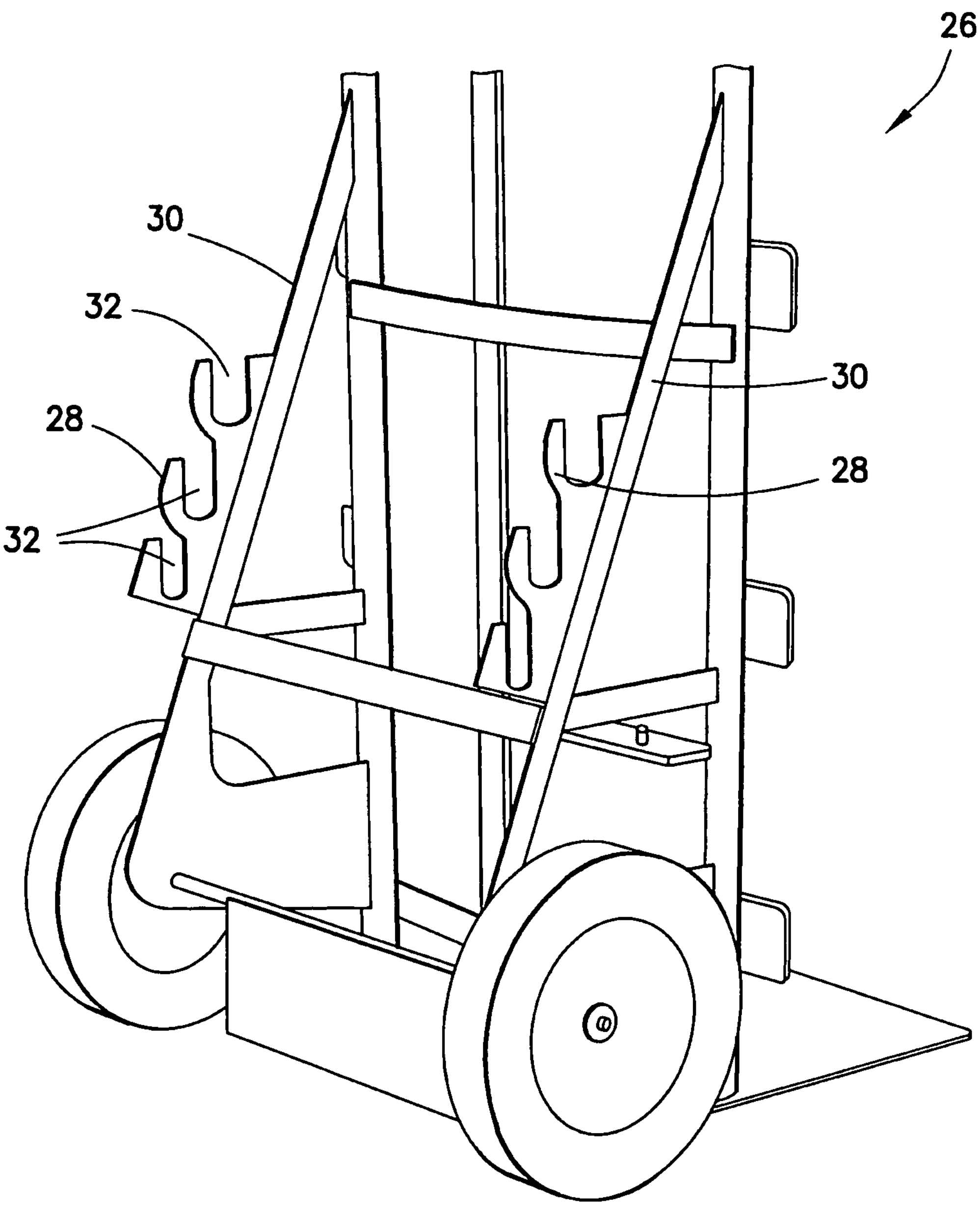
FIG.3 PRIOR ART
FIG. 3 is a perspective view of a portion of a conventional hand cart having supports for supporting an article during cutting.
Figure 4:
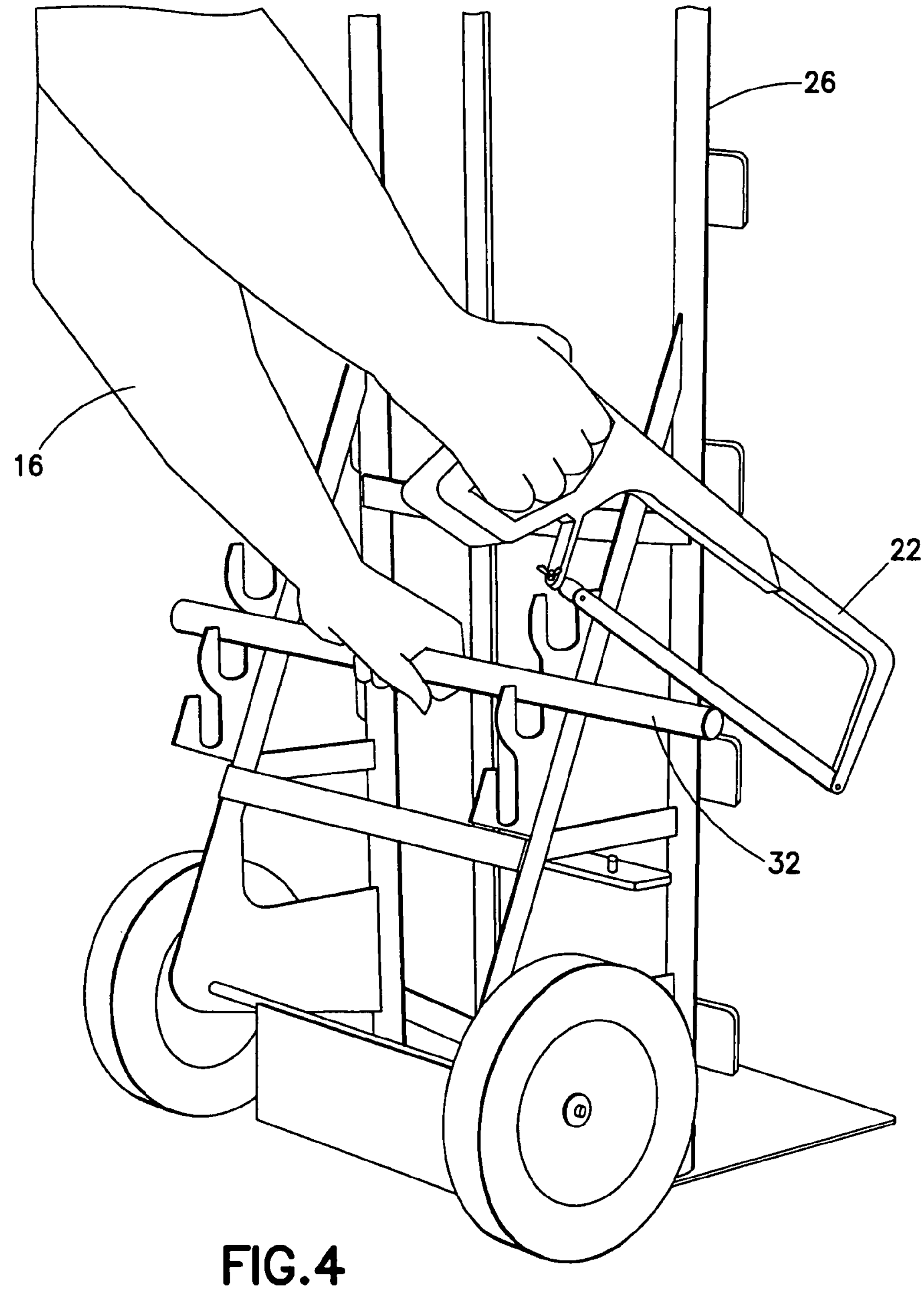
FIG.4 PRIOR ART
FIG. 4 is a perspective view of the cart shown in FIG. 3 in use for cutting a conduit.
Figure 8:
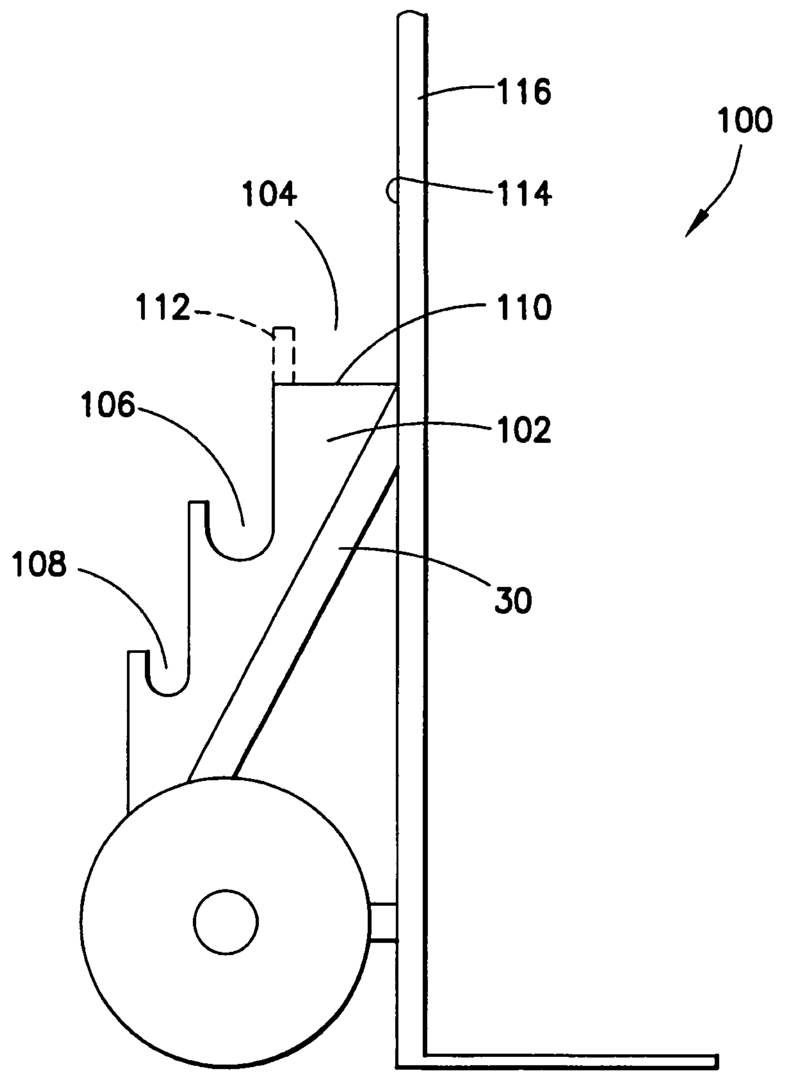
FIG. 8 is a side view of a hand cart having another alternate embodiment of the support shown in FIG. 5.

Referring also to FIG. 8, another alternate embodiment is shown. In this embodiment a hand cart 100 is provided with stringers 30 each having a support 102. The supports 102 each have three receiving areas 104, 106, 108 for supporting members to be cut. The first receiving area 104 has a flat bottom side 110 to support a bottom side of a wood stud thereon. An upright 112 could be provided, but the rearward facing sides 114 of the frame sections 116 of the hand cart could provide the lateral side locator function for locating the wood on the frame. The other two receiving areas 106, 108 have semi-circular bottom surfaces with different sizes to accommodate the outer curved shapes of different outer diameter size pipe or conduit similar to the slots 32 shown in FIG. 3.

Unlike the prior art hand cart 26 which can only be used to stably support members (such as pipe or conduit) having round outer surfaces, the hand cart 100 can be used to stably support both members having round outer surfaces (such as pipe or conduit) and members having non-rounded outer surfaces, such as having a flat side.

Figure 9:
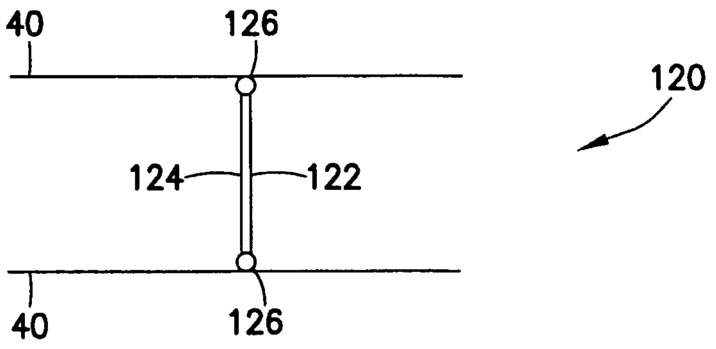
FIG. 9 is a top plan view of a device having two of the supports shown in FIG. 5 attached to each other and configured in an expanded configuration.
Figure 10:
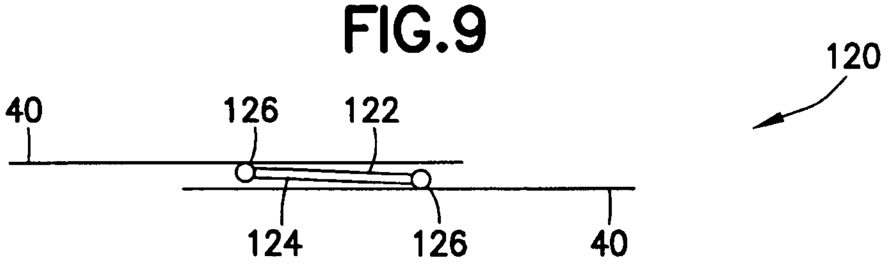
FIG. 10 is a top plan view as in FIG. 9 with the device in a collapsed configuration.

Referring now also to FIGS. 9 and 10, top plan views of another alternate embodiment of the invention is shown. In this embodiment a tool 120 is provided with two of the supports 40 and a connection 122 between the supports 40. The invention could also be provided between two of the supports 10, or 70, or 80 for example. The connection 122 comprises a link 124 pivotably connected to the supports 40 by pivot connections 126. FIG. 9 shows the tool 120 with the two supports 40 in an extended position relative to each other for attachment to a pail. However, FIG. 10 shows the tool 120 is a collapsed position for storage in a substantially flat configuration. Another alternate embodiment could comprise the supports 40 connected by resilient members, such as a polymer or rubber cord(s) or sheet(s) as the link(s) 124 for example.

Figure 11:
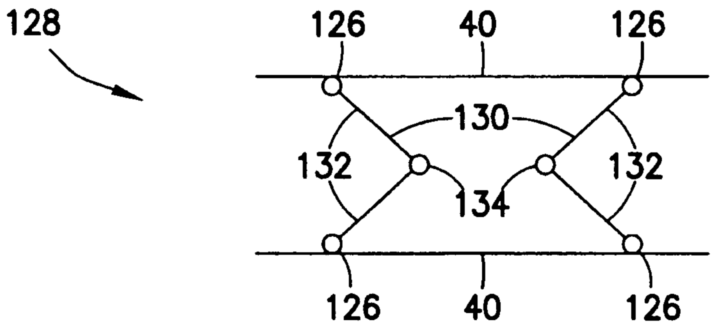
FIG. 11 is a top plan view of an alternate embodiment of the device shown in FIG. 9 having two of the supports shown in FIG. 5 attached to each other and configured in an expanded configuration.
Figure 12:
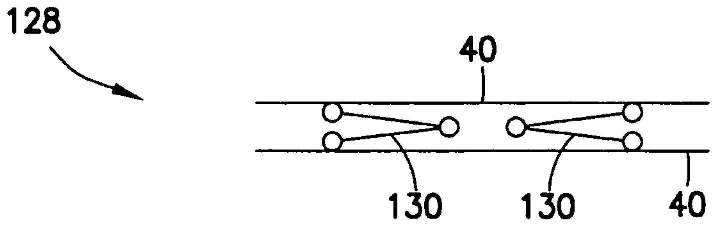
FIG. 12 is a top plan view as in FIG. 11 with the device in a collapsed configuration.

Referring now also to FIGS. 11 and 12, top plan views of another alternate embodiment of the invention is shown. In this embodiment a tool 128 is provided with two of the supports 40 and a connection between the supports 40. The invention could also be provided between two of the supports 10, or 70, or 80 for example. The connection comprises two links 130 pivotably connected to the supports 40 by pivot connections 126. Each link 130 has two arms 132 connected to each other by a pivot connection 134. FIG. 11 shows the tool 128 with the two supports 40 in an extended position relative to each other for attachment to a pail. However, FIG. 12 shows the tool 128 is a collapsed position for storage.

Figure 13:
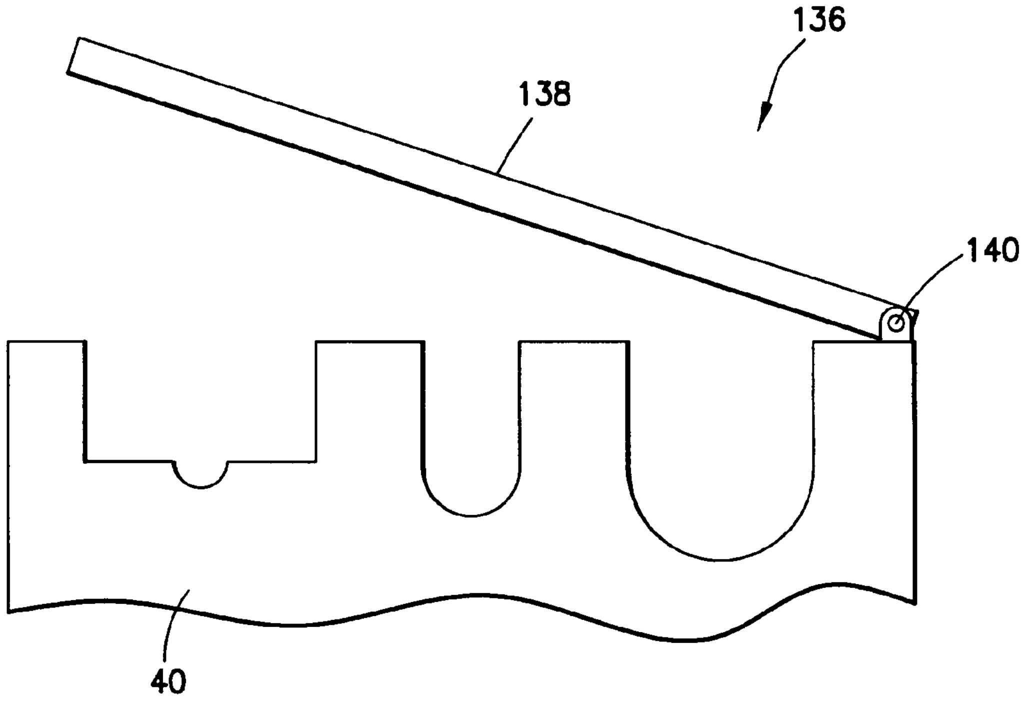
FIG. 13 is a side view of a device comprising the support shown in FIG. 5 with a movable lid attached to the support, and showing the lid in an open position.
Figure 14:
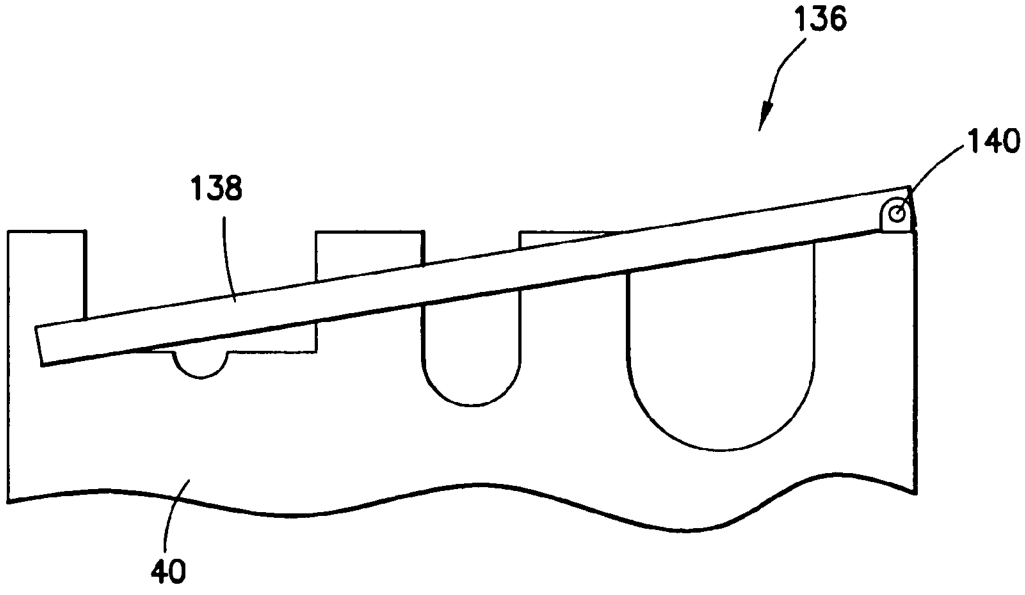
FIG. 14 is a side view as in FIG. 13 showing the lid in a closed position.

Referring now also to FIGS. 13 and 14, a partial front elevational view of another alternate embodiment of the invention is shown. In this embodiment a tool 136 is provided with the support 40 and a lid 138 connected to the support 40. The invention could also be provided on one of the supports 10, or 70, or 80 for example.

In this embodiment the lid 138 is pivotably connected to the support 40 by a pivot connection 140. However, in alternate embodiments any suitable type of movably connection could be provided. FIG. 13 shows the lid 138 in an open position wherein a member to be cut can be placed in one of the slots. FIG. 14 shows the lid 138 moved towards a closed position to close the slots. The lid 138 can help retain the pipe or conduit in the slot during cutting. The lid 138 can be used by an operator to apply pressure against the member being cut (perhaps with leverage) to keep the member from moving during cutting.

Figure 15:
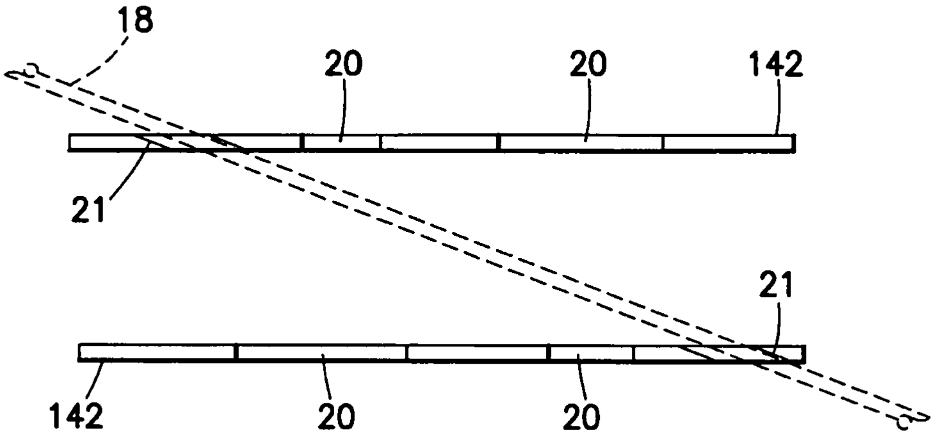
FIG. 15 is a plan top view of two alternative embodiment of the support shown in FIG. 5 with angled slots.

Referring now also to FIG. 15, a top plan view of another alternate embodiment of the invention is shown. In this embodiment two supports 142 are provided which are the same as the supports 10, but are reversed relative to each other and have straight slots 20 as well as angled slots 21. The angled slots 21 allow the member 18 being cut to be cut at an angle or miter.

Figure 16:
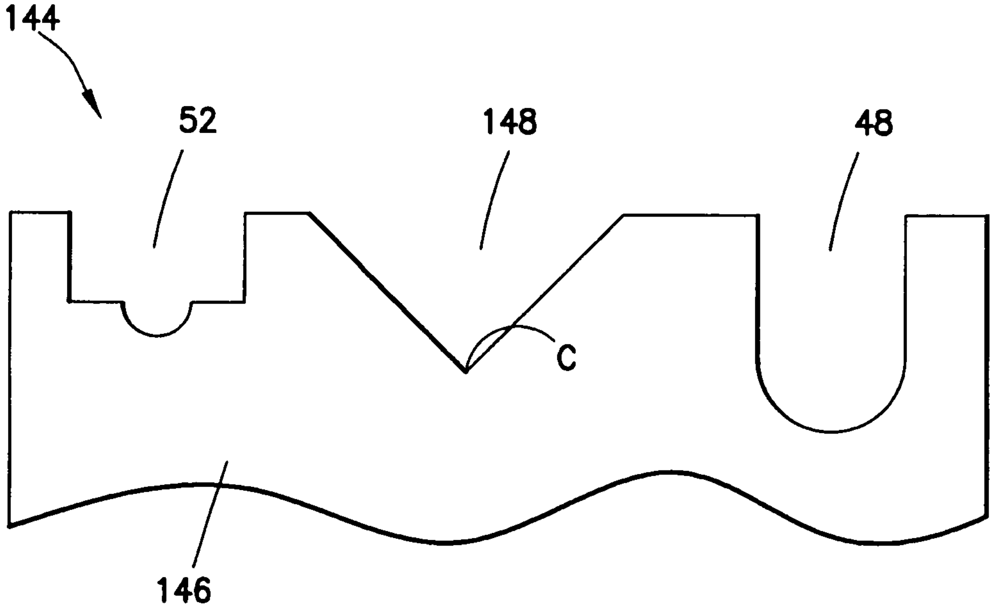
FIG. 16 is a partial side view of another alternate embodiment of the support shown in FIG. 5.

Referring now also to FIG. 16, a front elevational view of another alternate embodiment of the invention is shown. In this embodiment the support 144 has a frame 146 with three slots 48, 52 and 148. The slot 148 has a general V shape. A square or rectangular member to be cut can be securely located and held in the corner C curing cutting. This could be used for square or rectangular conduit, or wood molding strips for example.

In accordance with one embodiment of the invention, a cutting support 40 (or 70 or 80 or 102 or 142 or 144) is provided comprising a first section having a top side 54 with at least two recesses 48-52 extending into the first section from the top side, wherein a first one of the recesses 50 has a first shape, wherein a second one of the recesses 52 has a different second shape, wherein the first shape comprises a generally semi-circular section 50*a*, and wherein the second shape comprises at least one generally right-angle corner C; and a second section 42, 44, 46 connected to the first section for connecting the cutting support to another member 14. The cutting support 40 can comprise a one-piece generally flat metal member. The second section can comprise downward extending projections 44, 46 which form slots 42 adapted to receive a lip 12 of a pail 14 at two spaced locations. The first recess 50 comprises a straight section located above the generally semi-circular section 50*a*. The cutting support can further comprise a third recess 48 which is substantially a same shape as the first recess 50 and is larger than the first recess. The second recess 52 can comprise a generally semi-circular section 52*a*. The second recess 52 can comprise two of the generally right-angle corners C, and the generally semi-circular section 52*a* of the second recess 52 can be located between and below the two corners. The generally semi-circular section 84 of the second recess 82 can be located between and below the corner and a side end 75 of the cutting support.

A device 100 can be provided comprising a hand cart; and two of the cutting support 102 stationarily attached to the hand cart at their respective second sections.

A device 120 or 128 can be provided comprising a first cutting support 40 comprising a top side with at least two recesses extending into the top side, wherein the recesses have different shapes with a first one of the recesses comprising a general semi-circular section and a second one of the recesses comprising a general right-angle corner; a second cutting support 40 comprising a plurality of recesses; and a connection 122 or 130 movably connecting the first and second cutting supports to each other between a collapsed configuration and an extended configuration. The first and second cutting supports 40 can be sized and shaped to be removably mounted to a lip 12 of a pail 14. The recesses can be sized and shaped to support an article 18 between the first and second cutting supports in at least two of their respective recesses such that the article can be cut.

The connection can comprise a link 124 or 132 pivotably connecting the first and second cutting supports to each other. The connection can comprise a plurality of links connected in series between the first and second cutting supports. The connection can comprise two separate and spaced sets of the links connected between the first and second cutting supports.

A method can be provided comprising forming a first recess 50 in a generally flat frame member, wherein the first recess extends into a top side 54 of the frame member, and wherein the first recess comprises a generally semi-circular section 50*a*; forming a second recess 52 in the frame member, wherein the second recess extends into the top side and comprises a general right-angle corner C; and forming a mounting section 42, 44, 46 at a bottom side of the frame member, wherein the mounting section is sized and shaped to removably mount to a lip 12 of a pail 14, and wherein a cutting support is formed. The method can further comprise movably connecting the cutting support to a second cutting support by a connection 122 or 130 to form an assembly such that the assembly is reconfigurable between a collapsed configuration and an extended configuration.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A device comprising a first cutting support comprising:

a first section having a top side with at least two recesses extending into the first section from the top side, wherein a first one of the recesses has a first shape, wherein a second one of the recesses has a different second shape, wherein the first shape comprises a generally semi-circular section, and wherein the second shape comprises at least one generally right-angle corner spaced apart from the top side; and a second section connected to the first section for connecting the cutting support to another member;

where the cutting support comprises a one-piece generally flat member and the top side is a generally narrow surface thereof;

a second cutting support comprising a plurality of recesses; and a connection movably connecting the first and second cutting supports to each other between a collapsed configuration and an extended configuration, wherein the first and second cutting supports are sized and shaped to be removably mounted to a lip Of a pail, and wherein the recesses are sized and shaped to support an article between the first and second cutting supports in at least two of their respective recesses such that the article can be cut;

wherein the connection comprises a link pivotably connecting the first and second cutting supports to each other.

2. A device comprising as claimed in claim 1 wherein the connection comprises a plurality of links connected in series between the first and second cutting supports.

3. A device as claimed in claim 2 wherein the connection comprises two separate and spaced sets of the links connected between the first and second cutting supports.

4. A device comprising:

a first cutting support comprising a top side with at least two recesses extending into the top side, wherein the recesses have different shapes with a first one of the recesses comprising a general semi-circular section and a second one of the recesses comprising a general right-angle corner;

a second cutting support comprising a plurality of recesses; and a connection movably connecting the first and second cutting supports to each other between a collapsed configuration and an extended configuration, wherein the first and second cutting supports are sized and shaped to be removably mounted to a lip of a pail, and wherein the recesses are sized and shaped to support an article between the first and second cutting supports in at least two of their respective recesses such that the article can be cut; wherein the connection comprises a link pivotably connecting the first and second cutting supports to each other.

5. A device as claimed in claim 4 wherein the connection comprises a plurality of links connected in series between the first and second cutting supports.

6. A device as claimed in claim 5 wherein the connection comprises two separate and spaced sets of the links connected between the first and second cutting supports.

* * * * *